United States Patent
Lausch et al.

(10) Patent No.: US 8,188,733 B2
(45) Date of Patent: May 29, 2012

(54) ARRANGEMENT AND METHOD FOR RECOGNIZING AND CLASSIFYING PREFERABLY HIDDEN OBJECTS IN OBJECT AND/OR HUMAN TRAFFIC

(75) Inventors: Holger Lausch, Jena (DE); Wilfried Andrae, Jena (DE); Michael Brand, Grossrueckerswalde (DE); Christoph Werner, Jena (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 396 days.

(21) Appl. No.: 12/311,157

(22) PCT Filed: Sep. 19, 2007

(86) PCT No.: PCT/DE2007/001704
§ 371 (c)(1),
(2), (4) Date: Jan. 4, 2010

(87) PCT Pub. No.: WO2008/034434
PCT Pub. Date: Mar. 27, 2008

(65) Prior Publication Data
US 2010/0156407 A1      Jun. 24, 2010

(30) Foreign Application Priority Data
Sep. 19, 2006  (DE) .......................... 10 2006 044 398

(51) Int. Cl.
*G01R 33/02*  (2006.01)
(52) U.S. Cl. ....................................... 324/259; 324/232
(58) Field of Classification Search ................. 324/232, 324/259
See application file for complete search history.

(56) References Cited

U.S. PATENT DOCUMENTS
5,841,346 A     11/1998  Park

FOREIGN PATENT DOCUMENTS
| EP | 0831339 | 3/1998 |
| GB | 2395276 | 5/2004 |
| WO | WO-03/048808 | 6/2003 |

*Primary Examiner* — Bot Ledynh
(74) *Attorney, Agent, or Firm* — Jordan and Hamburg LLP

(57) ABSTRACT

An arrangement and method recognizes and classifies preferably hidden objects in object and/or human traffic. Objects relevant to security are recognized, located and tracked through the surroundings thereof in moving object and human traffic isolated in real time. Use is made of a combination of a field generator, the field of which is modified by at least one corresponding object within the scanned space, first sensors which repeatedly record the changes in the field and provide corresponding signals, second sensors which record defined surroundings of the object in real-time with relation to the first sensors and provide corresponding signals and analytical means which correlate and collate the signals from the sensors with each other and which give from the same the shape, spatial position and/or spatial orientation of the object.

33 Claims, 6 Drawing Sheets

ARRANGEMENT AND METHOD FOR RECOGNIZING AND CLASSIFYING PREFERABLY HIDDEN OBJECTS IN OBJECT AND/OR HUMAN TRAFFIC

BACKGROUND OF THE INVENTION

The invention relates to an arrangement and method for recognizing and classifying preferably hidden objects in object and/or human traffic within a detection area. Said recognition and classification depend on the material of the objects, and are carried out without contacting them. The invention can be applied both in safety engineering and for the registration of the movement of structures.

To ensure safety at public places, in buildings, at airports and railway stations and at other security-relevant traffic, transport and industrial plants, different monitoring systems are used for persons, pieces of luggage, packages, freights, containers, means of transport and other objects. For this purpose, the persons or objects are normally monitored in real spatio-temporal course individually and in security gate areas. Mostly, the technical means used for this purpose help to detect potential danger situations and to automatically classify the risk levels, thus supporting the security personnel by drawing their attention to such persons and objects. In particular, individual sensor-based methods only allow a sensor-specific pre-selection.

A task that has not been solved, so far, is the detection of specific weapon- or bomb-like objects carried by individual persons on their bodies or in pieces of luggage in human traffic that cannot be isolated. Here, the security personnel can only implement random controls. The selection of the random sampling is based on visual observation, directly by persons on site or indirectly by technical means (closed circuit TV) that possibly allow experience-based conclusions to be drawn about a danger potential from specific person characteristics or the odd behavior of the persons.

The object of this invention is to develop an arrangement and a method that allow to security-relevant objects to be recognized, located and tracked in moving object and human traffic that generally cannot be isolated.

SUMMARY OF THE INVENTION

According to the present invention, this object is solved by a method and apparatus by which magnetic fields are changed by at least one corresponding object in a scanned space, field changes are repeatedly recorded and corresponding signals outputted, a defined surrounding of the object in real-time with relation to the first sensors are recorder and corresponding signals delivered with relation to the field changes, and the signals are correlated and collated with each other so as to show the shape, spatial position and/or spatial orientation of the object. The generation of magnetic or radiation fields, which are spatially and temporally changed by security-relevant objects, and the use of sensors measuring or indicating these changes, as well as the visual recording of the whole object and/or human traffic within the detection area by suitable sensors, preferably video sensors, and at least the appropriate linkage and assignment of the signals provided by the sensors, allow the arrangement according to the invention to recognize and record the shape and size of security-relevant objects and persons in object and/or human traffic. If at least one security-relevant object is in the detection area, not only the shape, size, spatial position and orientation of the object can be recognized on the basis of the measured signals provided by the magnetic or radiation sensors in the analytical unit, but it is also possible to repeatedly mark, save and image the specific position in a video photo and thus a quasi virtual isolation can be achieved. Almost in real-time, security-relevant measures can then be implemented.

The field generators used in connection with the invention can be magnetic, electro-magnetic, electrical, mechanical, electro-mechanical, optical, acoustic and/or thermal ones. The sensors of the invention are magnetic, electro-magnetic, capacitive, inductive, mechanical, optical, acoustic, thermal, atomic, biological and/or chemical sensors. The second sensors of the invention are mainly magnetic or optical sensors. The sensors mentioned can also be used together in any combination. In an advantageous embodiment of the invention, a magnetic field is generated as a continuous or an alternating field by permanent and/or electro-magnets in the detection area, and this field is scanned or recorded by means of magnetic sensors (first sensors) that deliver their measured signals to the analytical means or analytical unit where they are correlated and collated with each other. In the detection area, the first sensors can be arranged under or/and above the object and/or human traffic (traffic) in at least one line positioned at a right angle with respect to the traffic in such a way that the complete width of the traffic is registered. Advantageously, the first sensors are arranged in several lines orientated rectangular with respect to the traffic. This also ensures that the traffic is recorded in a sufficient depth.

To detect magnetic objects, it is possible to use distortions of the terrestrial magnetic field that are measured by a three-dimensional magnetic-field sensor.

In an advantageous embodiment, a single-signal and series-signal processing unit is arranged downstream of the magnetic-field sensors to allow a spatial and time correlation processing of the signals and their collation. Permanent magnets can be used as magnetic field generators, and are positioned so that stray fields caused by magnetic objects that are carried by, or positioned near to, persons, are amplified when the traffic passes the detection area. Said permanent magnets generate a continuous magnetic field. If several permanent magnets are installed in a line in rectangular position with respect to the traffic, they can be arranged either with the same polarization or with always alternating polarization one next to the other or one behind the other for amplifying the stray field. An amplification of the stray fields can also be achieved if the permanent magnets are provided with ferromagnetic short-circuit units at their side opposite to the detection area and outside the object and/or human traffic. Advantageously, the permanent magnets are oblong rectangular parallelepipeds that are orientated towards the traffic direction and the ferromagnetic short-circuit units. In this arrangement, the height of the permanent magnets on the polarization level and the height or thickness of the ferromagnetic short-circuit units have a defined ratio to each other. The primary field of at least two permanent magnets, which are arranged in an alternating orientation, can be varied in its shape and range in dependence of the magnetic moment of the permanent magnets used and of their distance to each other. With respect to the traffic, the magnetic field sensors (first sensors) can be arranged either on the same side of or opposite to the magnetic field generators. If the magnetic field sensors are positioned on the side of the magnetic field generators, advantageously one magnetic field sensor and one magnetic field generator are always arranged next to the other, and the distances between the magnetic field sensors and the magnetic field generators are identical. To eliminate the direct influence of the primary field on the magnetic field sensors, one magnetic compensation unit is arranged for each magnetic field sensor and at the place of the sensor said unit generates a field that is opposite to the primary field and has the same strength. If the magnetic field sensors are arranged in line, disturbance and surrounding fields can be suppressed by frequency, high- and low-pass filters and by differential procedures so that the stray fields generated by the objects in the detection area can be discriminated.

Advantageously, the object-induced stray fields can be repeatedly measured at intervals so that the magnetic field changes can be spatially ascribed to different magnetic field sensor areas. The measurements are preferably repeated at a frequency ranging from 4 to 16 Hz. The repeated time- and spatial-relevant measurement of the stray field caused by magnetic objects allows to recognize characteristics of the field, such as for example poles, minima and maxima hardly or strongly separated with respect to space and time as well as the absolute and relative zero crossings of the stray field components.

To determine the shape of magnetic objects that cause the measured stray fields, they are compared or correlated with stored magnetic signatures (pattern signatures). It is also possible to verify or correlate the spatial and time assignment of the objects recognized by the magnetic field sensors by the parallel use of additional other sensors. The recognized objects in the detection area can be reliably tracked by their corresponding marking (time stamp).

The results gained from the signals of the first and second sensors in the analytical unit can be sent to stationary or mobile information or communication devices, or they can be saved in a cache or final memory. In each embodiment, the mobile visualization of the security-relevant persons and pieces of luggage is possible in real-time, so that security measures can be taken immediately in case of a potential danger. On the basis of the video sensors used, an image processing system is coupled to the person and object tracking, and provides the tracks of the persons and objects after they have passed a measuring bench in the detection area. In this way, identified persons and objects can be rapidly found, recognized, tracked and observed by technical means or visually on the basis of their movement direction in adjacent or other video-monitored areas.

To generate alternating magnetic fields, the permanent magnets positioned at right angles to the traffic direction can rotate around axes that are oriented parallel to the traffic flow. In the same way, the magnetic compensation units can rotate around parallel axes.

In the following, the invention is explained in detail in schematic drawings.

DETAILED DESCRIPTION OF THE INVENTION

Figure 1:
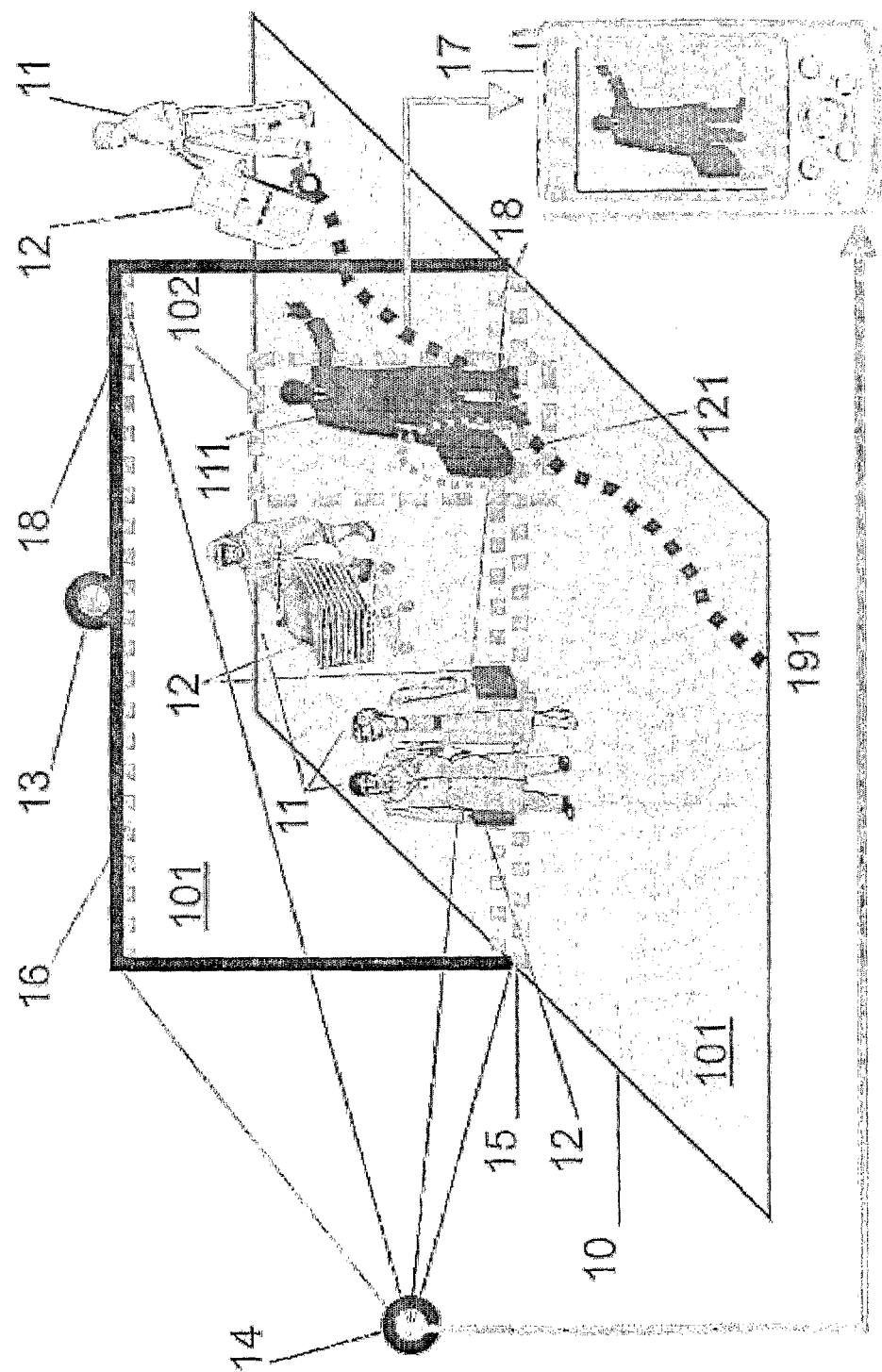
FIG. 1 is a schematic depiction of a detection area with the basic arrangement possibilities of the field generators and sensors according to an embodiment of the invention in a perspective view.

FIG. 1 schematically depicts a detection area or scanned space 10, for example an entry and/or exit area of a department store in which persons 11 and objects 12 move towards different directions. In the detection area 10, all persons 11 and objects 12 are visually registered by means of second sensors 13 and 14 several times. This registration is performed at a frequency of for example 8 Hz. But it can also be performed at a lower or higher frequency, depending on the object and human traffic 11, 12 and the depth of the detection area (spherical area).

In a subarea 101, which has normally a considerably lower depth expansion than the detection area 10, field generators 15, preferentially magnetic field generators, and first sensors 16 are arranged in the floor and/or in the ceiling under or above the object and human traffic 11, 12. They react to the generated fields (magnetic or radiation fields), and their changes cover the total width of the detection area 10, and as a whole, they form a measuring bench 18. The field generators can be for example at least one line of permanent magnets 15, and first sensors 16 are arranged opposite to them in corresponding lines. If the magnetic field of the permanent magnets 15 is disturbed by an object 121 in a specific area, it will be timely and spatially registered, the first sensors 16 deliver corresponding signals to an analytical unit 24 (see FIG. 2), said signals will be collated with the corresponding signals of the second sensors 13, 14, and the object with its surrounding 102 is shown on a display 17 (PDA). The figure represents a person 111 that carries a suitcase 121 containing a security-relevant, hidden object. The sensor 13 is required for the exact assignment of the objects and persons to the magnetic field signals, whereas the sensor 14 is necessary for visually recording the persons. Moreover, the signals of the sensors 15, which are arranged in at least one line, can be correlated with each other in such a way that a shape image of the object contained and hidden in the suitcase 121 is generated in the area, and can be compared in a preferably automatic manner with the pattern image of the object. Principally, the object can also be carried by a person more or less visibly on his or her body.

Figure 2:
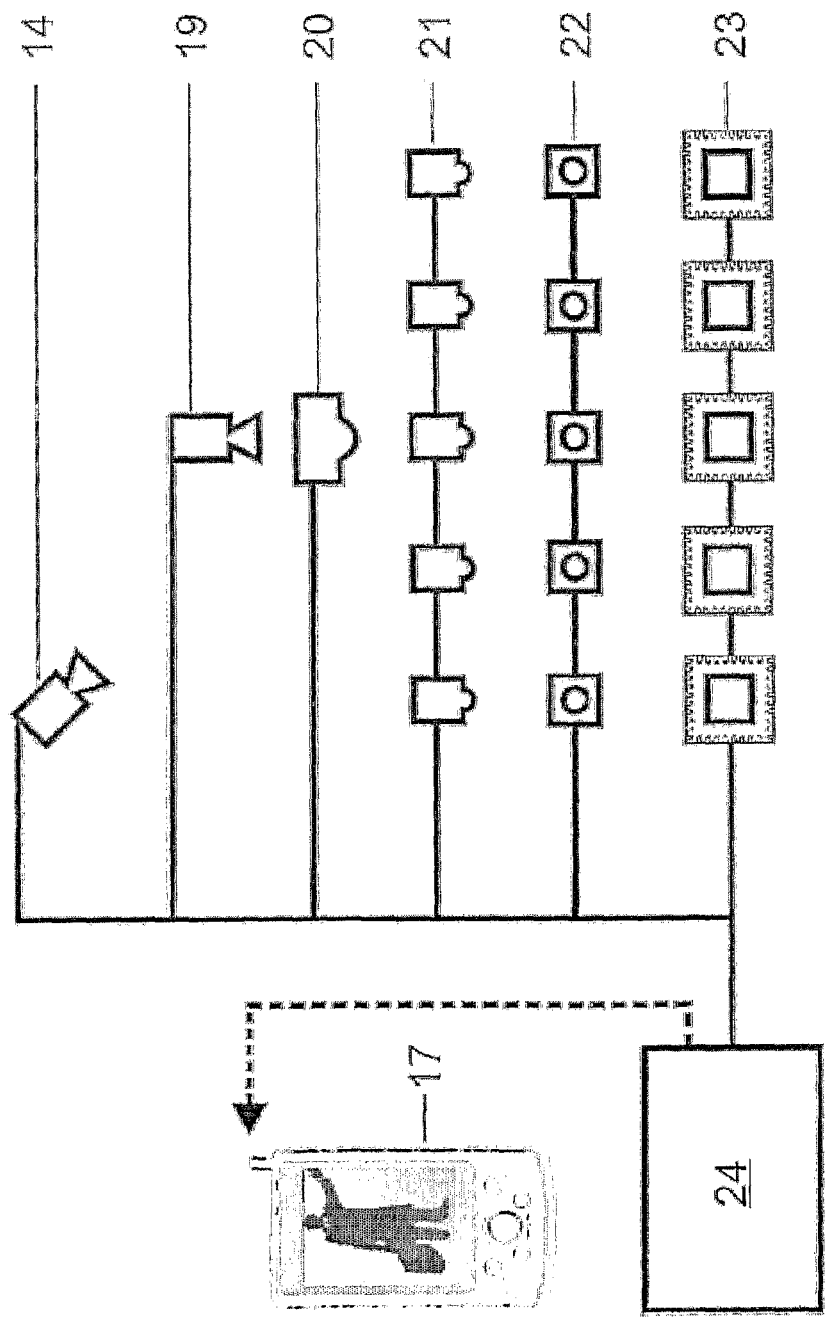
FIG. 2 is a schematic depiction of the first and second sensors used according to the invention and their connection to the analytical unit, image processing system included.

In detail for example the following happens in FIG. 1:

Within the subarea 101 the first sensors 16 record the spatial/time course of persons 11 who pass the detection area 10 with or without objects 12 to be detected at a defined measuring frequency that is at least as high as the frequency of sensor 13. Due to the spatially adjacent, cluster-type repeated arrangement of the first sensors 16, a spatial/time correlation of all signals of the sensors, sensor 14 included, is possible. The measurement is carried out by microcontrollers (not shown in the figure), and the data obtained are analyzed by a common, not shown, industrial PC, depending on the number of modules that can be combined in the analytical unit 24 (FIG. 2).

If the sensor lines of first sensors 16 detect a suspicious object or several such specific objects, each of these events will be assigned to one segment of the sensor lines 15 in a spatially and timely separated manner. Then, each of the position- and time-related events will be correlated to optically (visually) isolated persons in the space-time object track coordinates and the shape extensions of the sensor 13. Other thermal profiles and height profiles spatially and timely generated in the area of the measuring bench 18 can be included into this correlation, too. As a result of this procedure, the following information is provided at this point of time:
- at least one special object is in the subarea 101,
- the point of time and the extension of the special object on the measuring bench 18 in the width direction due to the number of the stimulated sensors, and
- the object is located directly on a person's body or possibly in a piece of luggage belonging to the person.

If such a special object is detected on or with a person, a critical situation has been reached from the point of view of safety, has caused a reasonable initial suspicion, and requires a verified action of the safety staff.

If the detection area 10 is recorded by a closed-circuit TV camera 14, at the height of the measuring bench 18 below the sensor 13, this technical means can be integrated in a time- and spatial-limited manner as a measuring range into the cluster of the first sensors 16 in order to avert a danger. In the case of a reasonable initial suspicion, the multisensor system accesses single images 102 in a spatial—and time-limited manner in the subarea 101. Via the spatially limited segmentation determined by the first sensors 16 and the sensor 13 in the range of the measuring bench 18, it is possible to create a contour frame as a partial area of the subarea 101 via the contour width of the top view of the detected anonymous person with or without a piece of baggage, and the contents of said partial area will be saved alone and/or presented in a PDA.

FIG. 2 shows the analytical unit 24 that is connected both with different sensors 14, 19, 20, 21, 22, 23 individually or in various combinations, and with a display 17 that can be a part of a PDA of the security staff. Here, the sensor 14 is used for video-recording the complete structure of the detection area 10, in particular the subarea 101. It can be arranged laterally and in front of the object and/or human traffic. A sensor 19 allows the movements 191 (see FIG. 1) of all persons and objects being in the detection area 10 to be tracked. Sensor 19 can be installed at the ceiling of the detection area 10, and preferably designed as a video camera. A sensor 20 delivers a height profile of the object and/or human traffic in the range of the measuring bench 18 (see FIG. 1), and like the sensor 19, it can also be installed at the ceiling of the detection area 10. The specific design of the sensor can be a laser. A sensor 20 for measuring the height profile is provided in the measuring bench 18. Generally, radar laser sensors in line-type arrangement can be used. A thermal sensor 22 that is also installed in the measuring bench 18 several times (as a multisensor) can be used for recording a thermal profile. A radiation or magnetic field sensor 23 is also provided in the measuring bench 18 several times, and can be designed as a radiation sensor (for example as an ABC sensor) or as a magnetic field sensor. Like the sensor 22 it can also be installed in the floor or at the ceiling of the detection area 10. Principally, at least magnetically or radiologically acting sensors can be arranged on the sides of the detection area 10, too.

Figure 3:
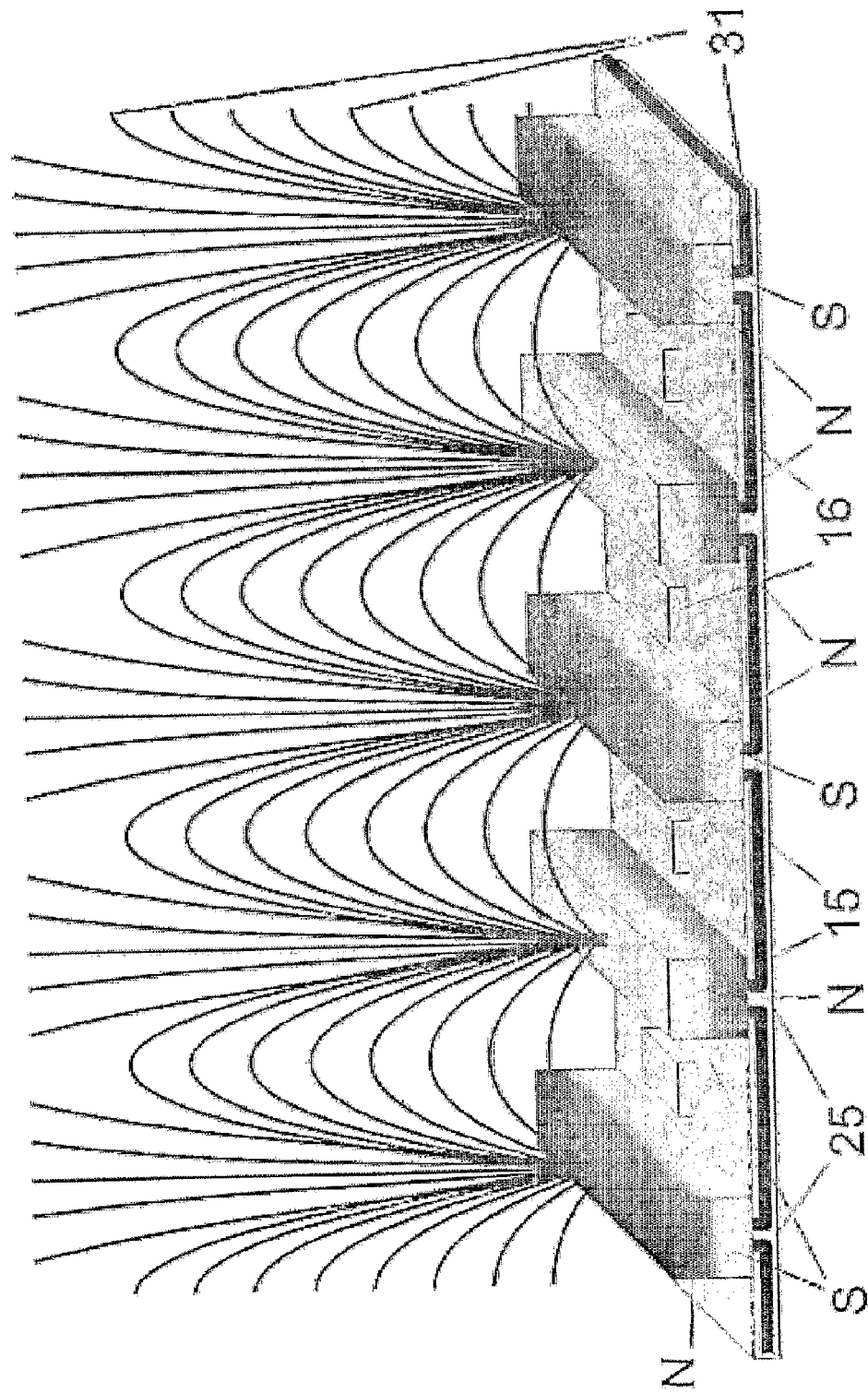
FIG. 3 is a schematic depiction of an arrangement of field generators and first sensors with means for field amplification.

FIG. 3 demonstrates permanent magnets 15 with different, alternating polarizations N/S that are arranged in a line and are designed as rectangular parallelepipeds. The rectangular parallelepiped magnets 15 are provided at the same distances from each other and are connected by magnetic short-circuit units 25 on one and the same side. The rectangular parallelepiped magnets 15 generate a magnetic field with magnetic flux lines 31 that, due to the short-circuit units, propagate increasingly towards one side, i.e., the side of the traffic 11, 12. Between the rectangular parallelepiped magnets, magnetic field sensors 16 are provided to measure disturbances in the magnetic field, that is a continuous field, in this case. The disturbances in the magnetic field are possibly caused by objects 12, 121.

Figure 4:
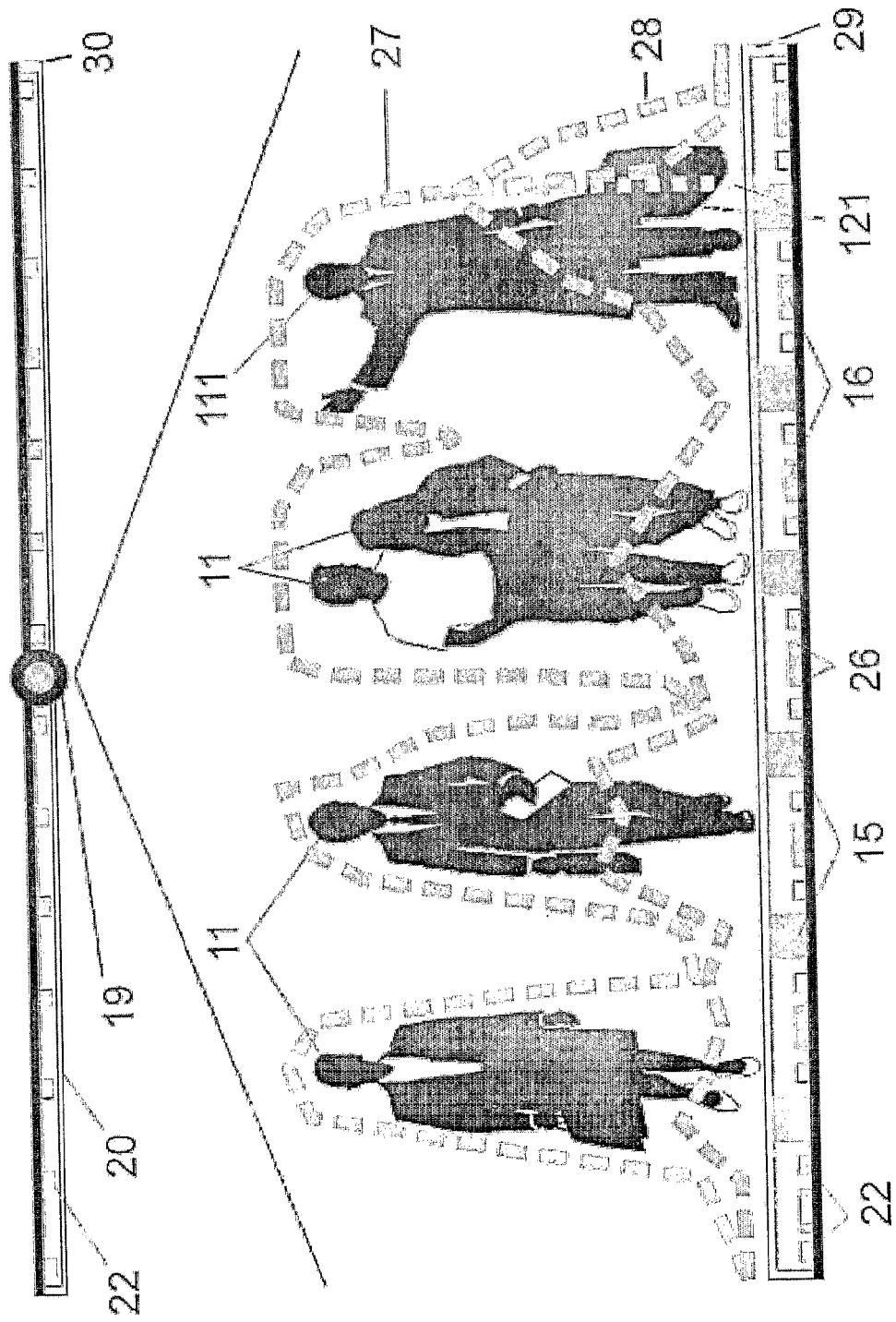
FIG. 4 is a cross-section of a detection area with a first arrangement of the field generators and sensors belonging to them.

In the cross-section of the detection area 10 that is presented at the measuring bench 18 in FIG. 4, an object and human traffic 11, 111, 121 exists between the floor 29 and the ceiling 30 of the detection area 10. In the floor 29 of the detection area 10, permanent magnets 15 with different polarizations N/S, magnetic field sensors 16 and thermal sensors 22 are installed. The magnetic field sensors 16 are provided with compensation units 26 that eliminate the influence of the primary field of the permanent magnets 15 on these sensors so that the latter only record the disturbances in the primary magnetic field. In the ceiling, a sensor 19 for determining a motion track 191 (FIG. 1), a line of sensors 20 for recording a distance or height profile and sensors 22 for determining a thermal profile are installed. The sensors 20 and 22 put out signals that determine the thermal profile and the height profile 27. The magnetic field sensors 16 record a magnetic profile 28 that shows a clear maximum at the place of the object 121. This maximum indicates that a security-relevant object could be in the suitcase 121.

Figure 5:
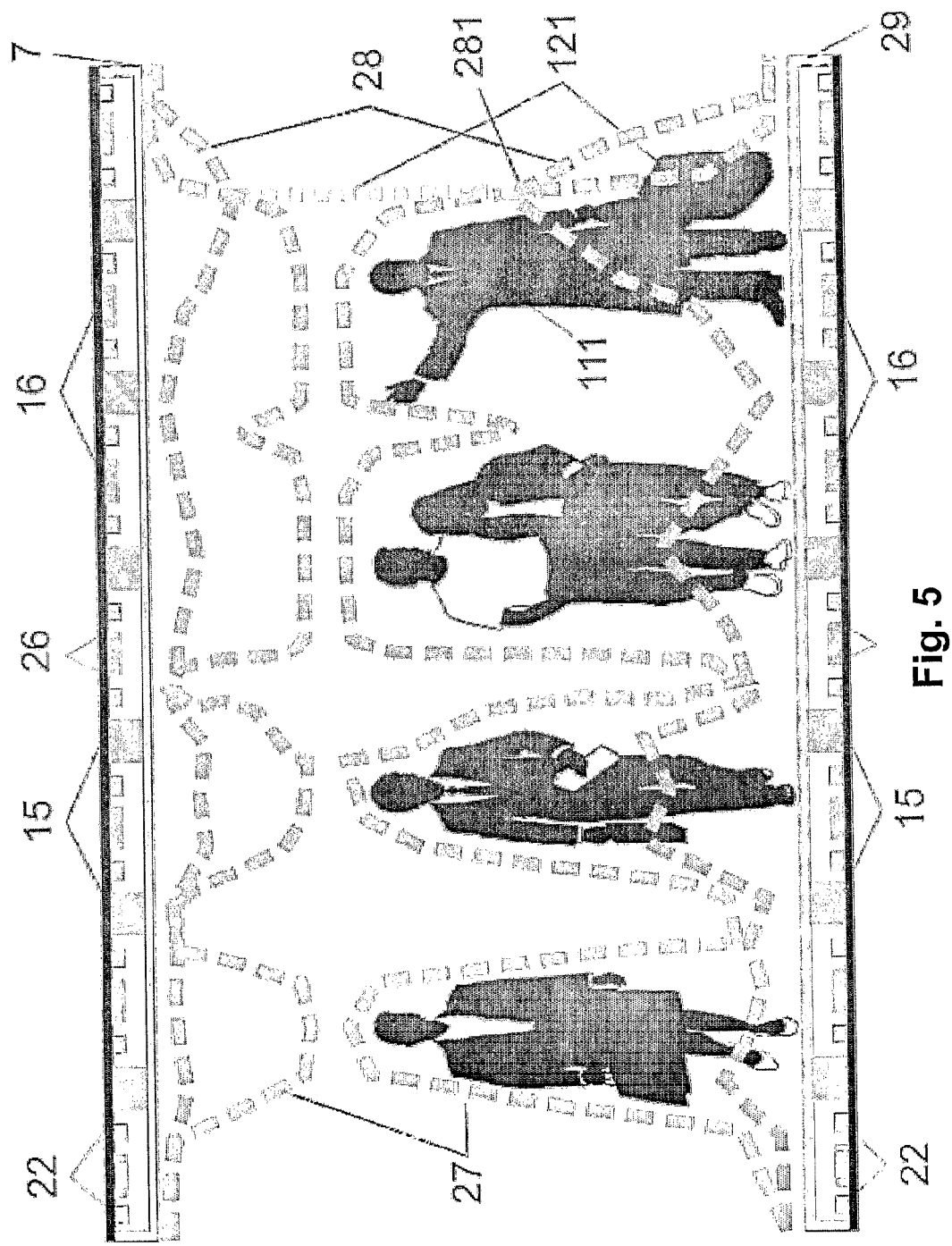
FIG. 5 is a cross-section of a detection area with a second arrangement of the field generators and sensors belonging to them.

FIG. 5 shows again the floor 29 and the ceiling 30 of the detection area 10 in a cross-section at the measuring bench 18. In the floor, rectangular parallelepiped magnets 15, magnetic field sensors 16 with compensation units 26 and thermal sensors 26 are arranged. The same arrangement is also provided at the ceiling 30. The thermal sensors 22 determine the thermal profiles 27 for each person or group of persons. The magnetic field sensors 16 determine magnetic field profiles 28 that show higher values at the places at which persons or groups of persons are, than at the places between the persons or groups of persons. This indicates that each of the persons carries objects of ferromagnetic material. However, the considerably deviating maximum 281 in the magnetic profile 28 shows that the person 111 carries lots of ferromagnetic material in the suitcase 121. Therefore, this person would be pursued, as explained in the description relative to FIG. 1.

Figure 6:
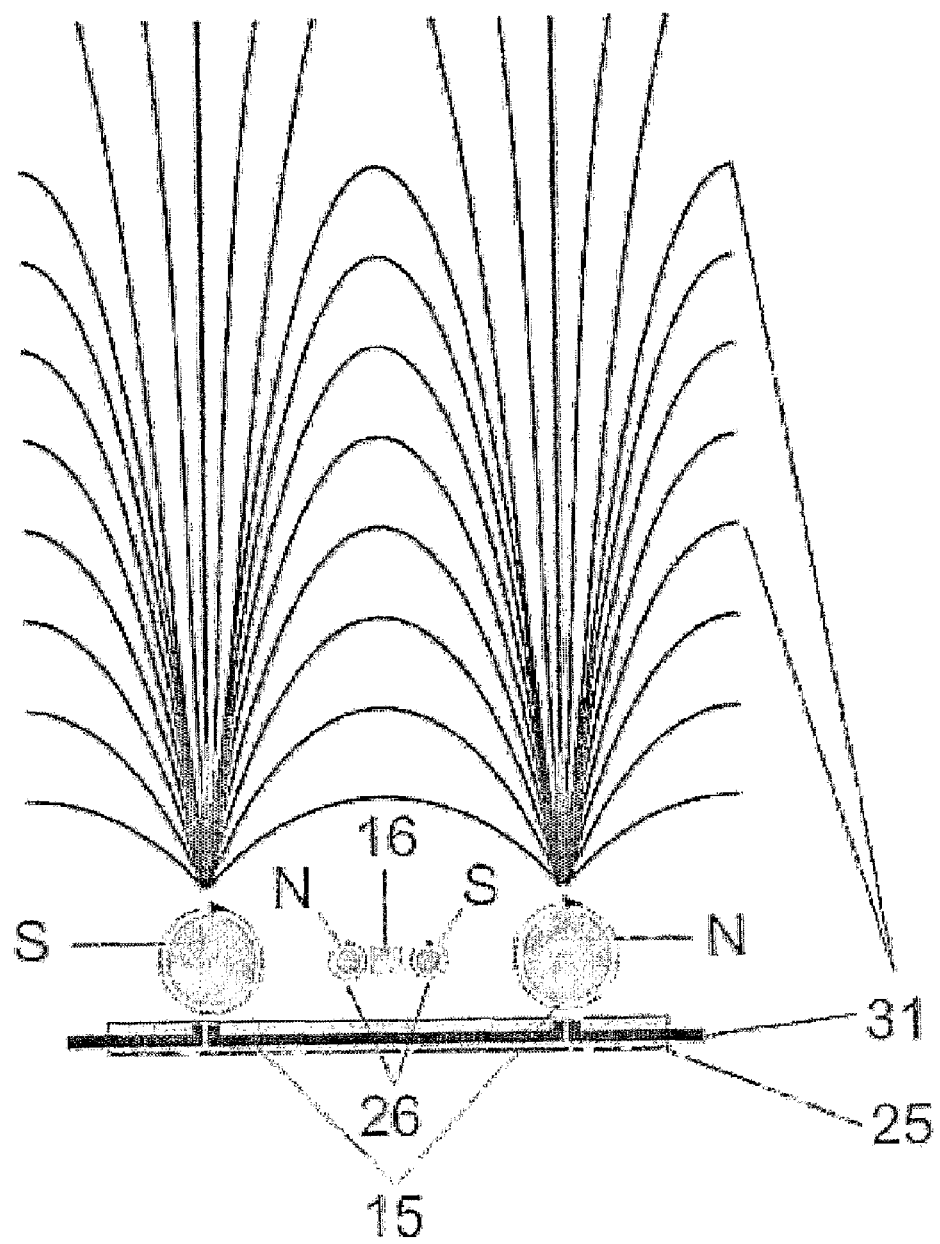
FIG. 6 is a schematic depiction of an arrangement of rotating permanent magnets and a compensation unit belonging to the sensor according to an embodiment of the invention.

FIG. 6 represents magnetic field generators 15 with different polarizations N/S that can be rotated around their axes between two positions staggered by 180°, with said axes being orientated rectangular with respect to the plane of projection. In this way, for example, an alternating magnetic field can be generated that is defined by the flux lines 31. Short-circuit units 25 are arranged between the magnetic field sensors 15. Between the magnetic field generators 15, magnetic field sensors 16 are installed and provided with compensation units 26 on either side. The polarizations N/S of these compensation units 26 are opposite to the polarizations of the magnetic field generators 15. For the rest, the explanations given to the figures above are applicable.

The arrangements of the sensors and field generators to each other and to the object and/or human traffic can also vary from the combinations described so far.

All elements presented in the description and the subsequent claims can be decisive for the invention both as single elements and in any combination.

The invention claimed is:

1. A device for recognizing and classifying objects in object and human traffic within a detection area, comprising:
   magnetic field generators configured to generate fields which are changed by at least one corresponding object in the detection area to create associated field changes;
   first sensors configured to repeatedly record the field changes and provide corresponding magnetic field signals, the first sensors being provided with a compensation unit configured to eliminate an influence of a primary field of the magnetic field generators on the first sensors so that said first sensors only record stray fields caused by the at least one corresponding object;

second sensors configured to record a defined surrounding of the at least one corresponding object in real-time with relation to the first sensors and provide corresponding second sensor signals; and an analytical unit configured to correlate and collate the signals of at least said first and second sensors with each other to provide a corresponding shape, spatial position and/or spatial orientation of the at least one corresponding object.

2. A device according to claim 1, wherein the first sensors are arranged in at least one line positioned rectangular with respect to an object and/or human traffic in the detection area.

3. A device according to claim 2, wherein the magnetic field generators are arranged in alternating order between ones of the first sensors.

4. A device according to claim 2, wherein the first sensors are arranged above and/or under the object and/or human traffic.

5. A device according to claim 1, wherein the magnetic field generators are permanent magnets configured to provide field amplification and/or field orientation.

6. A device according to claim 5, wherein the magnetic polarization of the permanent magnets arranged sequentially, alternately changes.

7. A device according to claim 5, wherein the permanent magnets are configured as oblong rectangular parallelepipeds positioned parallel with respect to the traffic direction.

8. A device according to claim 6, wherein the permanent magnets are configured as oblong rectangular parallelepipeds positioned parallel with respect to the traffic direction.

9. A device according to claim 5, wherein the permanent magnets are designed as oblong rectangular parallelepipeds positioned rectangular with respect to the traffic direction.

10. A device according to claim 6, wherein the permanent magnets are designed as oblong rectangular parallelepipeds positioned rectangular with respect to the traffic direction.

11. A device according to claim 1, wherein the permanent magnets are configured so as to be rotatable.

12. A device according to claim 5, wherein the permanent magnets are configured so as to be rotatable.

13. A device according to claim 1, wherein the first sensors are provided with frequency, high- and low-pass filters, such that after a differential procedure, disturbance and surrounding fields are suppressed.

14. A device according to claim 1, wherein electric, electro-magnetic, mechanical, optical, acoustic or thermal field generators are provided for the magnetic field generators.

15. A device according to claim 1, wherein electro-magnetic, capacitive, inductive, mechanical, optical, acoustic, thermal, atomic, biological or chemical sensors are provided for the first sensors.

16. A device according to claim 1, wherein the device includes an apparatus configured to compare a shape recognized by the analytical unit with a pattern.

17. A device according to claim 1, further comprising a display which is provided downstream of the analytical unit configured to visualize the at least one corresponding object and surroundings thereof.

18. A method of recognizing and classifying objects in object and human traffic within a detection area, comprising:

generating primary magnetic fields which are changed by at least one corresponding object in the detection area to create associated field changes;

compensating the associated field changes so as to eliminate an influence of the primary magnetic fields so that only stray fields caused by the at least one corresponding object are recorded;

repeatedly recording the compensated stray fields and providing corresponding magnetic field signals;

recording a defined surrounding of the at least one corresponding object in real-time with relation to the associated field changes and providing corresponding surrounding signals; and correlating and collating at least the magnetic field signals and the surrounding signals with each other to provide a corresponding shape, spatial position and/or spatial orientation of the at least one corresponding object.

19. A method according to claim 18, further comprising arranging first sensors configured to repeatedly record the associated field changes and provide the corresponding magnetic field signals in at least one line positioned rectangular with respect to an object and/or human traffic in the detection area.

20. A method according to claim 19, further comprising arranging magnetic field generators configured to generate the primary magnetic fields in alternating order between ones of the first sensors.

21. A method according to claim 19, wherein the first sensors are arranged above and/or under the object and/or human traffic.

22. A method according to claim 18, wherein the magnetic field generators are permanent magnets configured to provide field amplification and/or field orientation.

23. A method according to claim 22, further comprising alternately changing magnetic polarization of the permanent magnets which are arranged sequentially.

24. A method according to claim 22, wherein the permanent magnets are configured as oblong rectangular parallelepipeds positioned parallel with respect to the traffic direction.

25. A method according to claim 23, wherein the permanent magnets are configured as oblong rectangular parallelepipeds positioned parallel with respect to the traffic direction.

26. A method according to claim 22, wherein the permanent magnets are designed as oblong rectangular parallelepipeds positioned rectangular with respect to the traffic direction.

27. A method according to claim 23, wherein the permanent magnets are designed as oblong rectangular parallelepipeds positioned rectangular with respect to the traffic direction.

28. A method according to claim 22, wherein the permanent magnets are configured so as to be rotatable.

29. A method according to claim 18, further comprising providing the first sensors with frequency, high- and low-pass filters, such that after a differential procedure, disturbance and surrounding fields are suppressed.

30. A method according to claim 20, further comprising providing electric, electro-magnetic, mechanical, optical, acoustic or thermal field generators for the magnetic field generators.

31. A method according to claim 19, further comprising providing electro-magnetic, capacitive, inductive, mechanical, optical, acoustic, thermal, atomic, biological or chemical sensors for the first sensors.

32. A method according to claim 18, further comprising comparing a shape recognized by the analytical unit with a pattern.

33. A method according to claim 18, further comprising a displaying the at least one corresponding object and surroundings thereof.

* * * * *